United States Patent
Kunimatsu et al.

(10) Patent No.: US 10,323,730 B2
(45) Date of Patent: Jun. 18, 2019

(54) TENSIONER

(71) Applicant: TSUBAKIMOTO CHAIN CO., Osaka-shi, Osaka (JP)

(72) Inventors: Kohei Kunimatsu, Osaka (JP); Masanori Watanabe, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 212 days.

(21) Appl. No.: 15/224,790

(22) Filed: Aug. 1, 2016

(65) Prior Publication Data

US 2017/0037939 A1    Feb. 9, 2017

(30) Foreign Application Priority Data

Aug. 3, 2015  (JP) ................................. 2015-153111

(51) Int. Cl.
*F16H 7/08* (2006.01)

(52) U.S. Cl.
CPC ... *F16H 7/0836* (2013.01); *F16H 2007/0814* (2013.01)

(58) Field of Classification Search
CPC ..... F16H 2007/0806; F16H 2007/0859; F16H 2007/0812; F16H 2007/0814; F16H 7/0848
USPC ...................................................... 474/110
See application file for complete search history.

(56) References Cited

U.S. PATENT DOCUMENTS

| | | | | | |
|---|---|---|---|---|---|
| 5,842,943 A | * | 12/1998 | Tada | .................... | F16H 7/08 |
| | | | | | 474/109 |
| 5,860,881 A | * | 1/1999 | Tada | .................... | F16H 7/08 |
| | | | | | 474/101 |
| 5,879,256 A | * | 3/1999 | Tada | .................... | F16H 7/08 |
| | | | | | 474/110 |
| 6,193,623 B1 | * | 2/2001 | Koch | .................... | F16H 7/0836 |
| | | | | | 474/110 |
| 6,352,487 B1 | * | 3/2002 | Tada | .................... | F01L 1/02 |
| | | | | | 474/110 |
| 6,361,458 B1 | * | 3/2002 | Smith | ................... | F16H 7/0848 |
| | | | | | 474/109 |
| 6,383,103 B1 | * | 5/2002 | Fujimoto | ................ | F01L 1/02 |
| | | | | | 474/109 |
| 6,398,682 B1 | * | 6/2002 | Suzuki | .................. | F16H 7/08 |
| | | | | | 474/110 |

(Continued)

FOREIGN PATENT DOCUMENTS

| | | |
|---|---|---|
| JP | 9-303504 A | 11/1997 |
| JP | 9-303506 A | 11/1997 |

(Continued)

*Primary Examiner* — Henry Y Liu
(74) *Attorney, Agent, or Firm* — Westerman, Hattori, Daniels & Adrian, LLP

(57) ABSTRACT

Provided is a simple-structured tensioner that can reduce the processing and assembling workload. A tensioner 10 includes a plunger 20, a housing 30, a main spring 60, and a relief valve 40. The relief valve 40 includes a seat member 41, a valve member 42, and a relief spring 43. The plunger 20 includes an outward relief passage 23, and a bottom protrusion 22a protruding rearward integrally with and continuously from a plunger bottom 22. The relief spring 43 is disposed such that one end thereof is in contact with the valve member 42 while the other end is attached to the bottom protrusion 22a.

5 Claims, 7 Drawing Sheets

(56) References Cited

U.S. PATENT DOCUMENTS

| | | | | |
|---|---|---|---|---|
| 6,435,993 B1* | 8/2002 | Tada | ............... | F16H 7/0836 474/109 |
| 6,592,479 B2* | 7/2003 | Nakakubo | ............... | F16H 7/0848 474/109 |
| 6,945,889 B2* | 9/2005 | Markley | ............... | F16H 7/0848 474/109 |
| 7,174,799 B2* | 2/2007 | Yoshida | ............... | F16H 7/0836 474/101 |
| 7,608,004 B2* | 10/2009 | Yoshida | ............... | F16H 7/0836 474/110 |
| 7,618,339 B2* | 11/2009 | Hashimoto | ............... | F01L 1/02 474/109 |
| 7,699,730 B2* | 4/2010 | Emizu | ............... | F16H 7/0836 474/110 |
| 7,775,924 B2* | 8/2010 | Koch | ............... | F16H 7/0848 251/337 |
| 7,927,242 B2* | 4/2011 | Namie | ............... | F16H 7/0848 474/101 |
| 8,574,106 B2* | 11/2013 | Botez | ............... | F16H 7/0848 474/110 |
| 9,133,916 B2* | 9/2015 | Hofmann | ............... | F16H 7/0836 |
| 9,212,730 B2* | 12/2015 | Tyroller | ............... | F16H 7/0836 |
| 9,303,735 B2* | 4/2016 | Kurematsu | ............... | F16H 7/08 |
| 9,470,295 B2* | 10/2016 | Emizu | ............... | F01L 1/024 |
| 9,523,414 B2* | 12/2016 | Chekansky | ............... | F16H 7/08 |
| 2012/0052996 A1* | 3/2012 | Koiwa | ............... | F16H 7/0848 474/110 |

FOREIGN PATENT DOCUMENTS

| | | |
|---|---|---|
| JP | 2001-12569 A | 1/2001 |
| JP | 2011-80588 A | 4/2011 |
| JP | 2012-17824 | 1/2012 |

* cited by examiner

TENSIONER

BACKGROUND OF THE INVENTION

1. Field of the Invention

The present invention relates to a tensioner that provides appropriate tension to a running chain, belt, or the like.

2. Description of the Related Art

It has been common practice to use a tensioner for maintaining appropriate tension in a chain or the like. For example, a known chain guide mechanism, which slidably guides a transmission chain, such as an endless roller chain passing over respective sprockets of a crankshaft and of a cam shaft inside an engine room, uses a tensioner to urge a tensioner lever in order to maintain appropriate tension of the chain or the like.

A known tensioner 510 used in such a chain guide mechanism includes, as shown in FIG. 8, a plunger 520 having a plunger hole 521 that is open on a rear side, a housing 530 having a plunger bore 531 that is open on a front side and accommodates the plunger 520, a main spring 560 that is accommodated inside an oil pressure chamber 511 formed between the plunger 520 and the plunger bore 531 such as to freely expand and contract and that urges the plunger 520 toward the front side, and a relief valve 540 that releases the oil inside the oil pressure chamber 511 to the outside of the plunger 520 when the oil pressure in the oil pressure chamber 511 rises (see, for example, Japanese Patent Application Laid-open No. 2001-12569).

In the tensioner 510 described in Japanese Patent Application Laid-open No. 2001-12569, as shown in FIG. 8, a pressure passage 524 communicating with the oil pressure chamber 511, an outlet port 523 connecting the pressure passage 524 with the outside of the plunger 520, and a spring accommodating chamber 525 formed on the front side of the pressure passage 524 are provided in the plunger bottom 522. A relief valve 540 is made up of a valve member 542 slidably fitted into the pressure passage 524, and a relief spring 543 disposed in the spring accommodating chamber 525 and urging the valve member 542 toward the oil pressure chamber 511.

In this tensioner 510, when the oil pressure in the oil pressure chamber 511 rises, the valve member 542 moves forward against the urging force of the relief spring 543 so that the pressure passage 524 communicates with the outlet port 523 and the oil is released from the outlet port 523.

SUMMARY OF THE INVENTION

However, the tensioner 510 described in Japanese Patent Application Laid-open No. 2001-12569 entails the problem of high production workload due to the complex processing required for the plunger 520 such as forming the spring accommodating chamber 525 for setting the relief spring 543 in position, and forming the pressure passage 524 for restricting the orientation or movement of the valve member 542.

One possible way of avoiding the complex processing of the plunger described above is to make the relief valve 640 from component parts 641 to 644 as in a tensioner 610 shown as an example for reference in FIG. 9. A seat member 641 that divides the plunger hole 621 into an oil pressure space 621a on the rear side and a relief space 621b on the front side and that has an internal relief hole 641a, a valve member 642 disposed such as to close the internal relief hole 641a from the front side, a relief spring 643 urging the valve member 642 toward the internal relief hole 641a, and a component with a protrusion 644 that supports the relief spring 643 and restricts the stroke of the valve member 642 in the front to back direction are arranged near the bottom inside the plunger-hole 621. The seat member 641 and the component with a protrusion 644 are pressed against and fixed to the plunger bottom 622 with the main spring 660.

In the tensioner 610 shown in FIG. 9, however, there is a risk that the oil inside the oil pressure space 621a may leak to the outside of the relief space 621b or the plunger 620 if there is formed a gap between the seat member 641 and the component with a protrusion 644, and between the component with a protrusion 644 and the plunger bottom 622. The problem is that, the respective seal surfaces of the seat member 641, component with a protrusion 644, and plunger bottom 622 (more specifically, the front face of the flange 641d of the seat member 641, rear face and front face of the flange 644a of the component with a protrusion 644, and rear face of the plunger bottom 622) must be formed highly precisely.

The present invention is directed at solving these problems and it is an object of the invention to provide a simple-structured tensioner that can reduce the processing and assembling workload.

The present invention solves the problems described above by providing a tensioner including a plunger having a plunger hole that is open on a rear side, a housing having a plunger bore that is open on a front side and accommodates the plunger, a main spring that is accommodated inside an oil pressure chamber formed between the plunger and the plunger bore such as to freely expand and contract and that urges the plunger toward the front side, and a relief valve disposed inside the plunger hole. The relief valve includes a seat member that divides the plunger hole into an oil pressure space on the rear side and a relief space on the front side and that includes an internal relief hole, a valve member disposed such as to close the internal relief hole from inside of the relief space, and a relief spring that urges the valve member toward the internal relief hole. The plunger includes an outward relief passage that connects the relief space with outside of the plunger, and a bottom protrusion protruding toward the rear side integrally with and continuously from a plunger bottom of the plunger. The relief spring is disposed such that one end thereof is in contact with the valve member while the other end thereof is attached to the bottom protrusion.

According to an aspect of the invention, the plunger is provided with a bottom protrusion protruding toward the rear side integrally with and continuously from the plunger bottom, so that not only the number of component parts is reduced and the operation workload associated with assembling work is reduced, but also the degree of precision required in the formation of various constituent elements is lowered, because the risk of oil leakage through between a component with a protrusion and the seat member can be eliminated, which risk would arise if such a component were provided separately for supporting the relief spring and for restricting the stroke of the valve member. Also, since the plunger need not undergo a machining process such as cutting, grinding, or the like, an increase in the production workload can be avoided.

According to another aspect of the invention, a center through hole is formed in the center of the bottom protrusion such as to extend from a rear face of the bottom protrusion to a front face of the plunger bottom, so that this center through hole can be used as the outward relief passage. Moreover, since such a bottom protrusion can be formed by a drawing process wherein the plunger bottom is pressed in from the front face toward the rear face, the bottom protrusion can be provided easily without the need for machining such as cutting or grinding.

According to another aspect of the invention, an oil communication groove is formed in the rear face of the bottom protrusion, so that even when the valve member sits on the bottom protrusion during the oil pressure relief, the oil communication groove connects the relief space inside the plunger hole with the center through hole, whereby the oil in the relief space can be released to the outside through the oil communication groove and the center through hole.

According to another aspect of the invention, the plunger is provided with a skirt seat protruding toward the rear side integrally with and continuously from the plunger bottom. Since the seat member can be fixed relative to the plunger by fitting the skirt of the seat member onto the skirt seat during the assembly of the tensioner, the assembling work is achieved easily. Moreover, since the skirt of the seat member can be secured to the skirt seat without biasing means that press the seat member against the plunger bottom, the degree of design freedom can be increased.

According to another aspect of the invention, an outward relief through hole is formed in the plunger bottom such as to extend from a rear face to a front face of the plunger bottom. This outward relief through hole can function as an outward, relief passage, so that the amount of released oil can be adjusted easily.

According to another aspect of the invention, the front end of the main spring is disposed on the rear face of the flange of the seat member. Since the seat member can be pressed against and fixed to the plunger bottom by the urging force of the main spring, the relief valve can be easily assembled to the plunger without the need to press a component part of the relief valve into the plunger hole. Moreover, since the main spring is designed to have a larger spring force than the relief spring, the seat member can be pressed against the plunger bottom stably.

DESCRIPTION OF THE PREFERRED EMBODIMENTS

A tensioner 10 according to a first embodiment of the present invention will be described with reference to the drawings.

Figure 1:
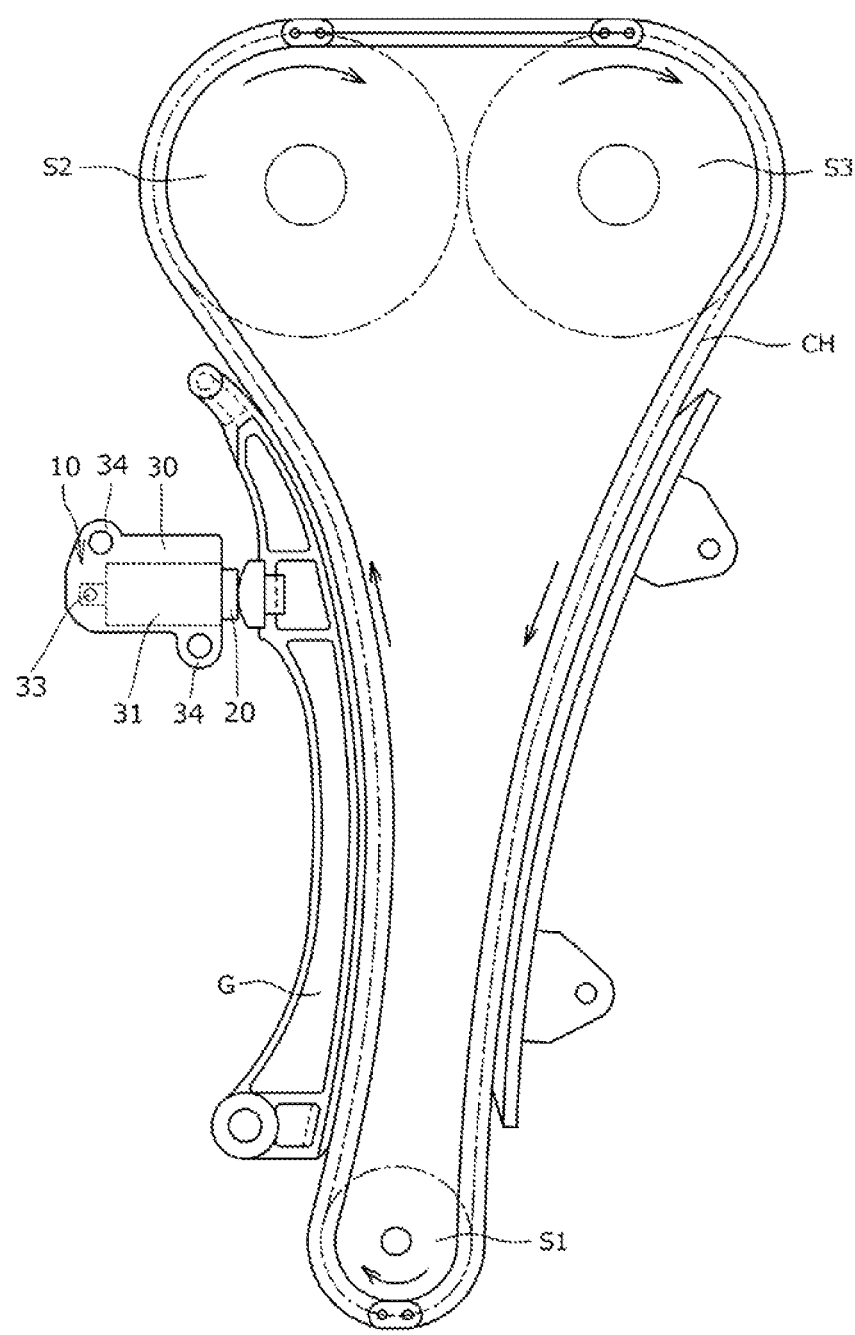
FIG. 1 is an illustrative diagram showing a timing system in which a tensioner according to a first embodiment of the present invention is incorporated.

First, the tensioner 10 is incorporated in a chain transmission used in a timing system or the like of a car engine. As shown in FIG. 1, the tensioner is attached to an engine block (not shown) to apply appropriate tension to the slack side of a transmission chain CH passing over a plurality of sprockets S1 to S3 via a tensioner lever G to suppress vibration during the drive.

Figure 2:
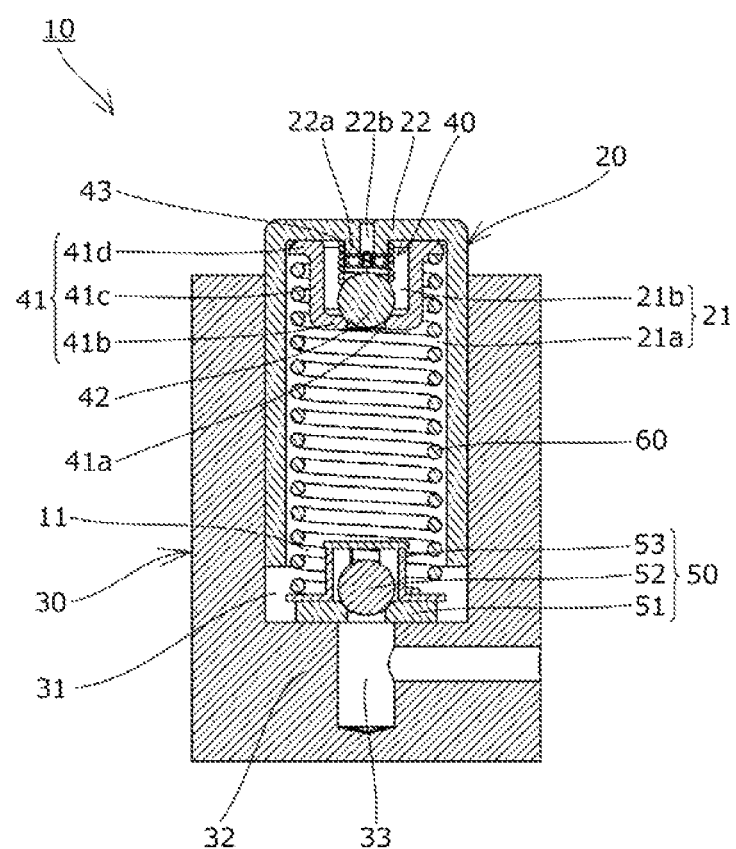
FIG. 2 is a cross-sectional view illustrating the tensioner according to the first embodiment.

The tensioner 10 includes, as shown in FIG. 2, a plunger 20 having a plunger hole 21, a housing 30 having a plunger bore 31 for accommodating the plunger 20, a relief valve 40 disposed inside the plunger hole 21, a check valve 50 disposed in a bottom part 32 of the housing 30, and a main spring 60 that is accommodated inside an oil pressure chamber 11 formed between the plunger 20 and the plunger bore 31 such as to freely expand and contract and that urges the plunger 20 toward the front side.

Hereinafter, various constituent elements of the tensioner 10 will be described with reference to the drawings.

Figure 3:
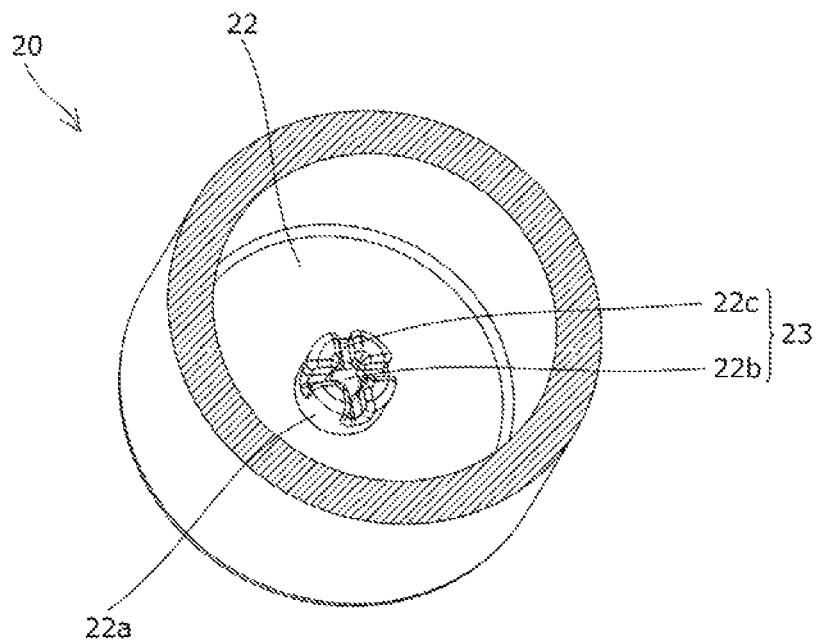
FIG. 3 is a cross-sectional perspective view illustrating the plunger bottom of the first embodiment.

The plunger 20 is made from a metal such as iron or the like and includes the cylindrical plunger hole 21 that is open on a rear side, and a disc-like plunger bottom 22 formed on a front side, as shown in FIG. 2 and FIG. 3.

A cylindrical bottom protrusion 22a is formed on the plunger bottom 22 protruding rearward integrally with and continuously from the plunger bottom 22 as shown in FIG. 2 and FIG. 3. In the center of the bottom protrusion 22a is formed a center through hole 22b extending from the rear face of the bottom protrusion 22a to the front face of the plunger bottom 22.

The bottom protrusion 22a is formed by a drawing process wherein the plunger bottom 22 is pressed from the front face toward the rear face. The plunger 20 having the plunger hole 21 is also formed by a deep drawing process. The bottom protrusion 22a functions as a part that engages with and supports one end of a relief spring 43 of the relief valve 40, and also as a part that provides a seat for a valve member 42 of the relief valve 40 when the valve member is pushed by the oil to move forward as the oil is released from the oil pressure chamber 11 so as to restrict the stroke of the valve member 42 in the front to back direction.

An oil communication groove 22c in the form of a cross is formed in the rear face of the bottom protrusion 22a, as shown in FIG. 3, which extends from an outer circumferential surface of the bottom protrusion 22a to the center through hole 22b. This oil communication groove 22c connects a relief space 21b inside the plunger hole 21 with the center through hole 22b when the valve member 42 sits on the bottom protrusion 22a, whereby the oil in the relief space 21b can be released to the outside of the plunger 20 when the valve member 42 sits on the bottom protrusion 22a for oil pressure relief.

This way, in this embodiment, the center through hole 22b and the oil communication groove 22c together function as an outward relief passage 23 that connects the relief space 21b with the outside of the plunger 20.

The oil communication groove 22c may be provided in any number and formed in any shape, as long as the groove connects the relief space 21b with the center through hole 22b, with the valve member 42 sitting on the bottom protrusion 22a.

The housing 30 includes, as shown in FIG. 1 and FIG. 2, a cylindrical plunger bore 31 that is open on the front side, a bottom part 32 formed on the rear side, an oil supply hole 33 formed in the bottom part 32 to extend through an outer wall of the housing 30 to the plunger bore 31, and a mounting part 34 for fixedly attaching the housing 30 to an engine block.

The relief valve 40 is made up of a seat member 41 that divides the plunger hole 21 into an oil pressure space 21a on the rear side and the relief space 21b on the front side, the valve member 42 disposed such as to close an internal relief hole 41a formed in the seat member 41 from inside of the relief space 21b, and a relief spring 43 urging the valve member 42 toward the internal relief hole 41a, as shown in FIG. 2.

The seat member 41 includes, as shown in FIG. 2, a top 41b where the internal relief hole 41a is formed, a skirt 41c extending vertically toward the front side from the peripheral edge of the top 41b, and a flange 41d extending radially outward from the front end of the skirt 41c. The flange 41d is set in tight contact with the plunger bottom 22.

The valve member 42 is spherical as shown in FIG. 2, but may be formed in any shape as long as it can close the internal relief hole 41a.

The relief spring 43 is disposed such that one end thereof is in contact with the valve member 42 while the other end is fitted on the outer circumference of the bottom protrusion 22a.

The check valve 50 allows the oil to flow in from the outside through the oil supply hole 33 into, the oil pressure chamber 11, and stops the oil from flowing out from the oil supply hole 33.

The check valve 50 is made up of, as shown in FIG. 2, a ball seat 51 disposed in tight contact with the front face of the bottom part 32 of the housing 30, a spherical check ball 52 that can be seated on the ball seat 51 in tight contact therewith, a retainer 53 arranged on the front side of the check ball 52 to restrict the movement of the check ball 52, and a ball spring (not shown) disposed between the check ball 52 and the retainer 53. The ball spring (not shown) is provided to urge the check ball 52 toward the ball seat 51, but the ball spring (not shown) may not be needed depending on the embodiment.

The main spring 60 is disposed such that, as shown in FIG. 2, its front end is arranged on the rear face of the flange 41d of the seat member 41 while its rear end is arranged on the front face of the flange of the retainer 53. Thus the main spring 60 presses the seat member 41 against the plunger bottom 22, as well as presses the ball seat 51 and the retainer 53 against the bottom part 32 of the housing 30. The main spring 60 is designed to have a larger spring force than the relief spring 43.

Next, a second embodiment of the present invention will be described with reference to FIG. 4 and FIG. 5. The second embodiment is, in part, exactly the same as the previously described first embodiment. Therefore, only the differences from the first embodiment will be described below.

Figure 4:
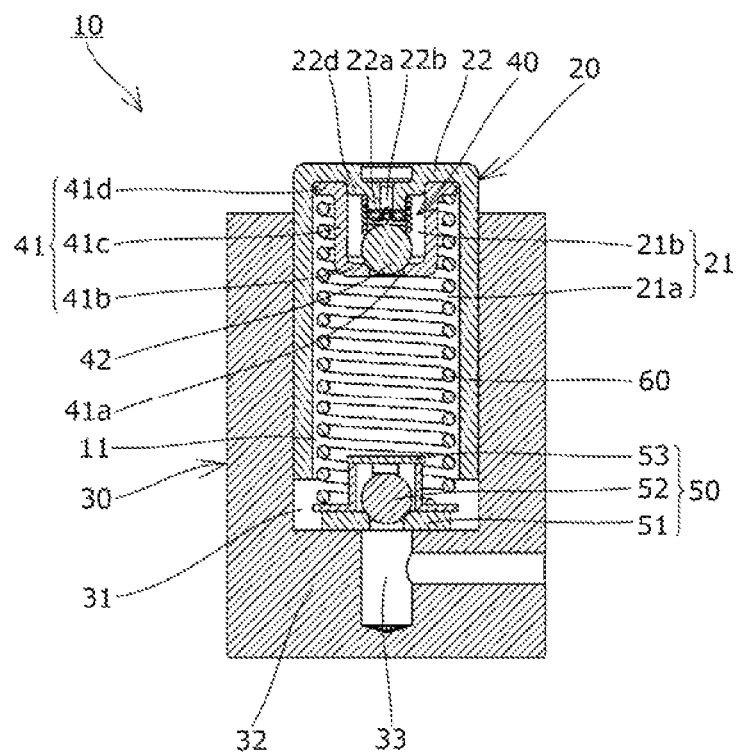
FIG. 4 is a cross-sectional view illustrating a tensioner according to a second embodiment.
Figure 5:
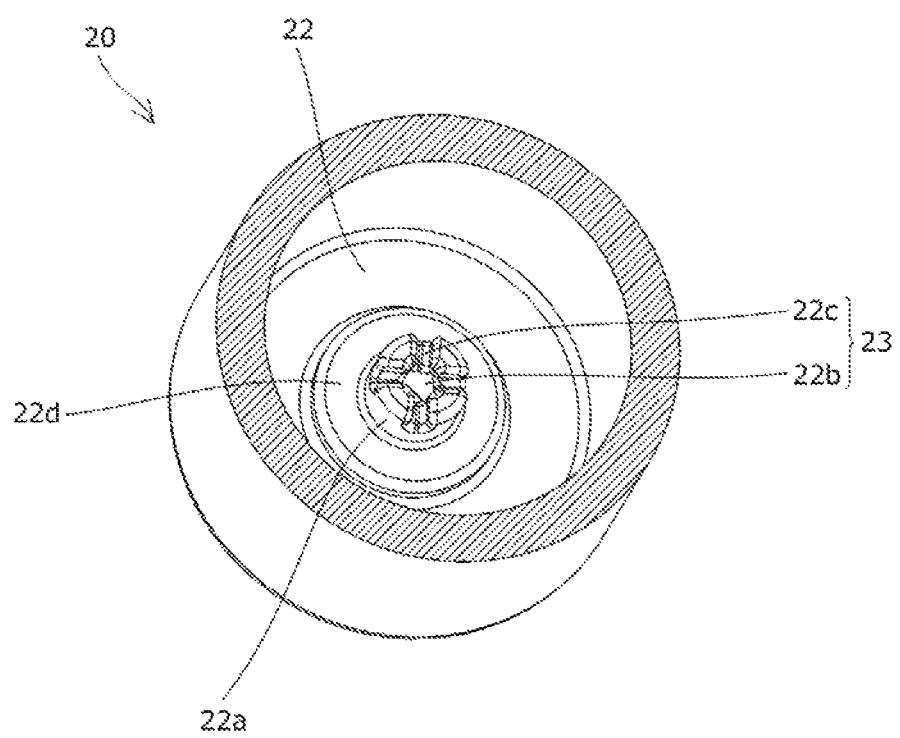
FIG. 5 is a cross-sectional perspective view illustrating the plunger bottom of the second embodiment.

In the tensioner 10 of the second embodiment, as shown in FIG. 4 and FIG. 5, an annular skirt seat 22d protruding rearward integrally with and continuously from the plunger bottom 22 is provided adjacent and on the radially outer side of the bottom protrusion 22a. The protruding amount of this skirt seat 22d from the plunger bottom 22 is smaller than the protruding amount of the bottom protrusion 22a from the plunger bottom 22. The skirt 41c of the seat member 41 is fitted onto (lightly pressed onto) the outer circumference of the skirt seat 22d.

While the main spring 60 is designed to have a larger-spring force than the relief spring 43 in the previously described first embodiment, the force of the main spring 60 can be set smaller than the force of the relief spring 43 in the second embodiment because the seat member 41 is secured to the plunger bottom 22 as described above.

Next, a third embodiment of the present invention will be described with reference to FIG. 6 and FIG. 7. The third embodiment is, in part, exactly the same as the previously described first embodiment. Therefore, only the differences from the first embodiment will be described below.

Figure 6:
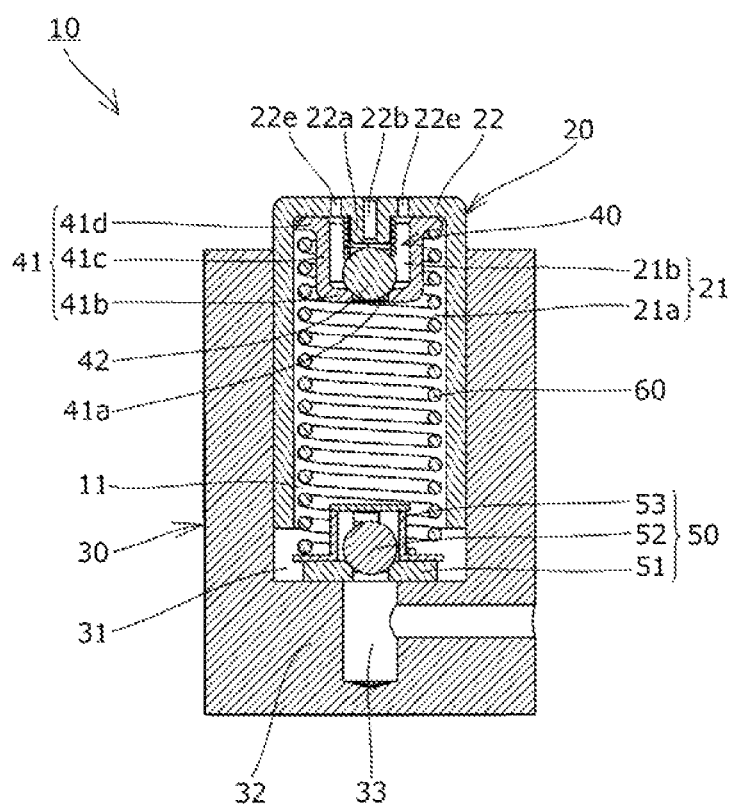
FIG. 6 is a cross-sectional view illustrating a tensioner according to a third embodiment.
Figure 7:
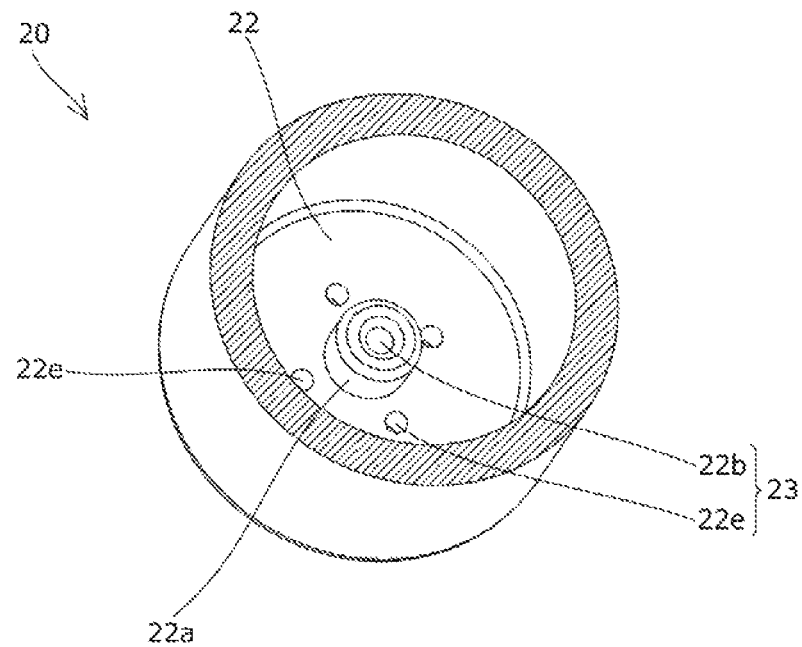
FIG. 7 is a cross-sectional perspective: view illustrating the plunger bottom of the third embodiment.
Figure 8:
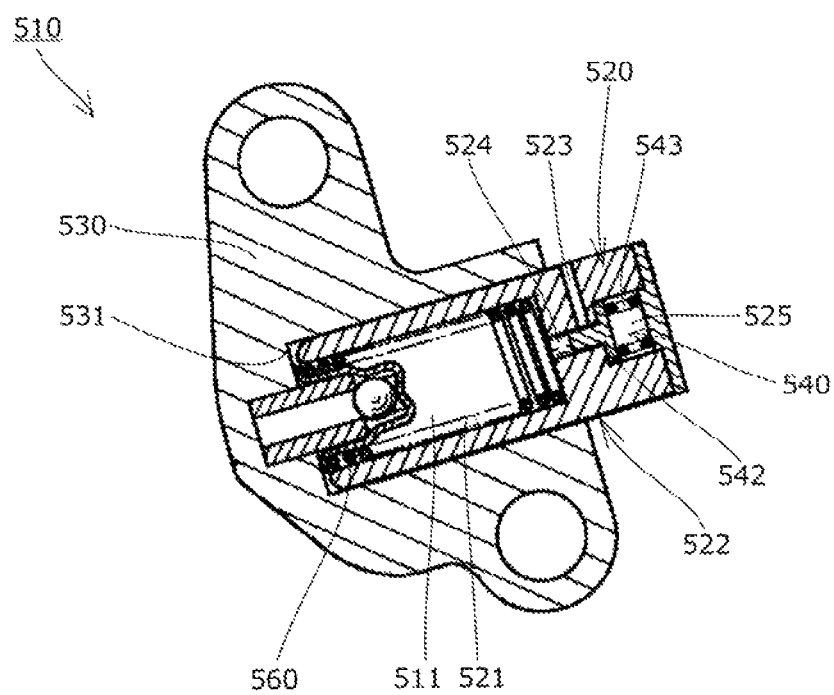
FIG. 8 is a cross-sectional view illustrating a conventional tensioner.
Figure 9:
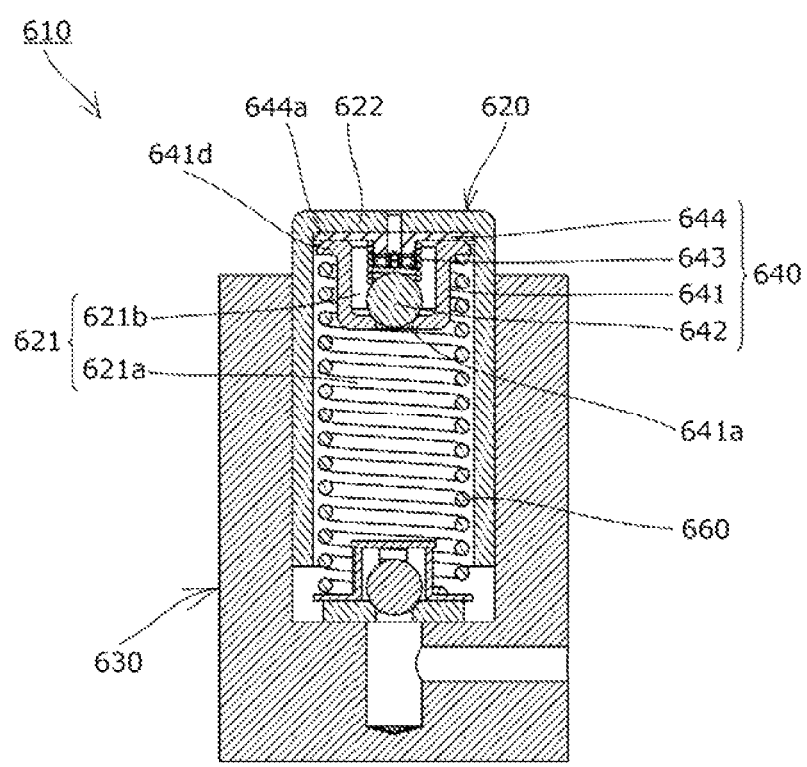
FIG. 9 is a cross-sectional view illustrating an example of a tensioner for reference.

In the tensioner 10 of the third embodiment, as shown in FIG. 6 and FIG. 7, a plurality of outward relief through holes 22e are formed in the plunger bottom 22 on the radially outer side of the bottom protrusion 22a such as to extend through the plunger bottom 22 from the rear face to the front face. In the third embodiment, these outward relief through holes 22e and the center through hole 22b together function as an outward relief passage 23 that connects the relief space 21b with the outside of the plunger 20.

While the tensioner 10 of the third embodiment does not include the oil communication groove 22c in the rear face of the bottom protrusion 22a, the tensioner may be provided with the oil communication groove 22c.

While embodiments of the present invention have been described in detail, the present invention is not limited to the above-described embodiments and may be carried out with various design changes without departing from the scope of the present invention set forth in the claims.

For example, various configurations of several embodiments described above may be freely combined to form other tensioners.

While the tensioner was described as a component to be incorporated in a timing system of a car engine in the embodiments above, the purpose of use of the tensioner is not limited to this specific application.

Also, while the tensioner was described as a component that applies tension to a transmission chain with a tensioner lever in the embodiments above, the plunger can directly guide the transmission chain slidably with a distal end thereof to apply tension to the transmission chain.

The tensioner may not necessarily be applied to a transmission mechanism with a transmission chain but can also be used for similar transmission mechanisms that use belts, ropes and the like, and can be applied in a variety of industrial fields where it is required to apply tension to an elongated component.

While the housing accommodating the plunger is described as the component known as a tensioner body that is attached to an engine block or the like in the embodiments described above, the housing is not limited to the specific form described above and may be a cylindrical component known as a sleeve inserted into a body hole formed in the tensioner body.

While a center through hole is formed in the center of a bottom protrusion in the embodiments described above, the center through hole may not be needed if there are provided other parts that function as an outward relief passage.

The outward relief passage may have any specific design as long as it connects the relief space inside the plunger hole with the outside of the plunger.

What is claimed is:

1. A tensioner comprising:
a plunger having a plunger hole that is open on a rear side;
a housing having a plunger bore that is open on a front side and accommodates the plunger;
a main spring that is accommodated inside an oil pressure chamber formed between the plunger and the plunger bore such as to freely expand and contract and that urges the plunger toward the front side; and
a relief valve disposed inside the plunger hole,
the relief valve including a seat member that divides the plunger hole into an oil pressure space on the rear side and a relief space on the front side and that includes an internal relief hole, a valve member disposed such as to close the internal relief hole from inside of the relief space, and a relief spring that urges the valve member toward the internal relief hole, the plunger being configured as a unitary single metal piece and including an outward relief passage that connects the relief space with outside of the plunger, and a bottom protrusion protruding toward the rear side integrally with and continuously from a plunger bottom of the plunger, a center through hole as the outward relief passage being formed in a center of the bottom protrusion such as to extend from a rear face of the bottom protrusion to a front face of the plunger bottom, and the relief spring being disposed such that one end thereof is in contact with the valve member while the other end thereof is attached to the bottom protrusion.

2. The tensioner according to claim 1, wherein an oil communication groove is formed in the rear face of the bottom protrusion.

3. The tensioner according to claim 1, wherein
the seat member includes a top where the internal relief hole is formed, and a skirt extending vertically toward the front side from a peripheral edge of the top, and
a skirt seat protruding toward the rear side integrally with and continuously from the plunger bottom is formed on a radially outer side of the bottom protrusion,
the skirt being attached to the skirt seat.

4. The tensioner according to claim 1, wherein an outward relief through hole is formed in the plunger bottom on a radially outer side of the bottom protrusion such as to extend through the plunger bottom from a rear face to a front face thereof.

5. The tensioner according to claim 1, wherein
the seat member includes a top where the internal relief hole is formed, a skirt extending vertically toward the front side from a peripheral edge of the top, and a flange extending radially outward from a front end of the skirt,
a front end of the main spring is arranged on a rear face of the flange, and
the main spring is designed to have a spring force that is larger than a spring force of the relief spring.

* * * * *